United States Patent [19]

Fregeau

[11] Patent Number: 5,556,654
[45] Date of Patent: Sep. 17, 1996

[54] MAGNET BEVERAGE TREATMENT

[76] Inventor: Leo J. Fregeau, 6540 Pontiac Dr., La Grange, Ill. 60525

[21] Appl. No.: 67,171

[22] Filed: May 26, 1993

Related U.S. Application Data

[63] Continuation of Ser. No. 899,585, Jun. 18, 1992, abandoned, which is a continuation of Ser. No. 579,589, Sep. 10, 1990, abandoned, which is a continuation of Ser. No. 87,964, Aug. 17, 1987, abandoned, which is a continuation of Ser. No. 834,118, Feb. 25, 1986, abandoned, which is a continuation of Ser. No. 906,790, May 17, 1978, abandoned.

[51] Int. Cl.⁶ .................................................. B01D 35/06
[52] U.S. Cl. ........................... 426/234; 99/275; 210/222; 210/695; 426/592
[58] Field of Search ............................. 99/485, 483, 275, 99/278, 276, 279, 295, 300; 426/237, 234, 592; 366/273; 210/222, 695; 95/28; 96/1

[56] References Cited

U.S. PATENT DOCUMENTS

| | | |
|---|---|---|
| 824,320 | 6/1906 | Weitzmann . |
| 1,035,777 | 8/1912 | Bullock . |
| 1,044,201 | 11/1912 | Lincoln . |
| 3,219,318 | 11/1965 | Hershler . |
| 3,439,899 | 4/1969 | Hershler . |
| 3,495,620 | 2/1970 | Raimondi et al. . |
| 3,661,302 | 5/1972 | Braun . |
| 3,689,033 | 9/1972 | Holmstrom . |
| 3,985,649 | 10/1976 | Eddelman . |
| 3,987,967 | 10/1976 | Kuznetsov . |
| 3,995,835 | 12/1976 | Cichy . |
| 4,018,902 | 4/1977 | Dee . |
| 4,018,906 | 4/1977 | Ostendorf . |
| 4,054,270 | 10/1977 | Gugger . |
| 4,605,498 | 8/1986 | Kulish . |
| 5,113,751 | 5/1992 | Holcomb . |
| 5,248,437 | 9/1993 | Forrest . |

FOREIGN PATENT DOCUMENTS

| | | | |
|---|---|---|---|
| 1603804 | 7/1971 | France | 426/237 |
| 294903 | 10/1929 | United Kingdom . | |

OTHER PUBLICATIONS

In re Ruskin, 148USPQ221.
Davis & Rawls, Magnetism and Its Effects on The Living System, 1974, Exposition Press: Hicksville, N.Y., pp. xii, xiii, xvi, xvii, 16, 17.
Toth and Nielson, Pyramid Power, 1974, Warner: New York, pp. 132–147, 162–163, 220–241.
King, Pyramid Energy Handbook, 1977, Warner: New York, pp. 26, 27, 40, 41, 44, 45, 72–89, 128, 129.
Davis et al, The Magnetic Effect, 1975, Exposition Press: Hicksville, N.Y., pp. 5–9, 30, 35, 79–80, 115–117, 124–125.
Chemical Abstracts, vol. 8, 1914, p. 2304.
"Future Science–Life Energies and the Physics of Paranormal Phenomena," Edited by White et al, 1977.
Anchor Books—Doubleday & Co., Inc.: Garden City, New York, pp. 431–443.

Primary Examiner—Robert W. Jenkins
Attorney, Agent, or Firm—Nixon & Vanderhye P.C.

[57] ABSTRACT

A method of treating consumable liquids, the liquids so produced, and an assembly for practicing the method. Consumable liquid is passed through a magnetic field having properties effective to enhance the flavor of the liquid, the field preferably being established by a permanent magnet establishing a continuous polarity on opposite sides of the liquid with a minimum magnetic field strength of about 3000 Gauss. The assembly for treating the liquids may include first and second tubular permanent magnets having opposite radially spaced first and second pole portion of opposite polarity, a pair of pole pieces received between the pole portions, and in encasement for maintaining the magnets and pole pieces together so that a fluid flow path is defined through the magnets and a predetermined gap established by the pole pieces, and so that the pole portions of the same polarity for each magnet are on the same side of the flow path.

7 Claims, 1 Drawing Sheet

MAGNET BEVERAGE TREATMENT

This is continuation of application Ser. No. 07/899,585, filed Jun. 18, 1992, now abandoned, which is a continuation of application Ser. No. 07/579,589, filed Sep. 10, 1990, now abandoned, which is a continuation of application Ser. No. 07/087,964, filed Aug. 17, 1987, now abandoned which in turn is a file wrapper continuation of 06/843,118 filed Feb. 25, 1986, now abandoned, which in turn is a file wrapper continuation of 906,790 filed May 17, 1978, now abandoned.

BACKGROUND AND SUMMARY OF THE INVENTION

In the past, there have been numerous attempts and proposals for the modification of flavors of foods in order to improve the general desirability of foods and/or to allow the utilization of lower "quality" foods without a commensurate drop in flavor. In the past, such attempts have centered on the use of chemical flavor modifiers such as monosodium glutamate (MSG) and the 5'-nucleotides. Although the mode of action of most of such chemical flavor modifiers is unknown, there are perceptible differences in the flavors of the food treated therewith. However, some chemical flavor modifiers have suspected adverse health effects, and additionally the cost of such chemical flavor modifiers is not insignificant.

According to the present invention, flavor enhancement of foods may be accomplished without any adverse health consequences and at a cost that is almost insignificant. According to the present invention, it is possible to enhance the flavor of consumable beverages by passing the liquid through a magnetic field having properties sufficient for flavor enhancement. The magnetic field preferably is established by a permanent magnet with continuous polarity on opposite sides of the liquid, the strength of the magnetic field being a minimum of about 3000 Gauss. The specific gravity of the liquid and its viscosity also may be increased by passage of the liquid through a magnetic field having properties effective for such purposes, and in fact the increased specific gravity and viscosity of the liquid undoubtedly play a part in the enhanced flavor thereof. In particular, according to the present invention, a method of treating a pure consumable liquid is provided consisting essentially of the steps of establishing a substantially constant magnetic field with a minimum strength of about 3000 Gauss, and passing the liquid through the field.

A typical assembly for practicing the method of the invention comprises a first tubular permanent magnet having opposite radially spaced first and second pole portions of opposite polarity. A second tubular magnet is also preferably provided, having opposite radially spaced first and second pole portions of opposite polarity, and a pair of pole pieces are received between the first and second pole portions of the magnets. Means are provided for maintaining the magnets and pole pieces together so that a fluid flow path is defined from the first tubular magnet past a predetermined gap established by the pole pieces and through the second magnet, so that the first and second pole portions of the same polarity for each magnet are on the same side of the flow path.

The mechanism of the flavor enhancement achieved according to the present invention is not entirely understood, however, the apparent perceptual attributes of liquids which are enhanced according to the present invention include enhanced aroma, increased mouth feel or viscosity, improved smoothness of overall tactile responses, reduced harshness of acidity, and a marked decrease in sharpness of ethyl alcohol tactual response. Possible underlying effects achieved according to the invention may include the inducement of favorable associations in a physical sense so that favored H-bonding, van der Waal's association forces, and any liquid-solid micelle adsorption/desorption processes could occur. The flavor enhancement achieved according to the invention does not dissipate over time, but apparently effects permanent modification of the liquid in one or more ways. Relative specific gravity measurements of control and treated liquids show very slight, but consistent, increased specific gravities after treatment; relative viscosity measurements indicating increase in viscosity; for acidic liquids relative pH measurements indicate an increase in the pH of the treated liquid; and gas chromatography of headspace volatiles indicate a significant reduction in average peak height of treated liquids compared with untreated liquids.

A wide variety of consumable beverages have been utilized in practicing the present invention, and the sensory evaluation thereof compared to untreated liquids. All sensory evaluation studies were conducted under laboratory conditions as indicated by the Manual on Sensory Testing Methods, American Society for Testing Materials, Publication ST 434, Philadelphia, 1968. Density was determined gravimetrically with a pyconmeter, viscosity was measured with a Hoeppler flow type viscosimeter, and pH was measured with an expanded scale Orion Research Model 701A pH Meter. Beverages tested include coffee, gin, chicken soup, orange juice, apple juice, extruded soy protein, beer, tea, lemonade, brandy, rum, cointreau, creme de menthe, and ethyl alcohol—there was no indication that classes of consumable liquids existed which were not susceptible to treatment according to the invention. In general, the test results indicated that the practice of the method according to the present invention altered the flavor of liquid foods and beverages sufficiently to result in statistically significant difference discrimination for participants non-selected on the basis of acuity. The liquids treated were "pure" in the sense that no foreign material was added to the liquids before passage through the magnetic field.

It is the primary object of the present invention to provide for the enhancement of desirable liquid properties. This and other objects of the invention will become clear from an inspection of the detailed description of the invention, and from the appended claims.

DETAILED DESCRIPTION OF THE INVENTION

Figure 1:
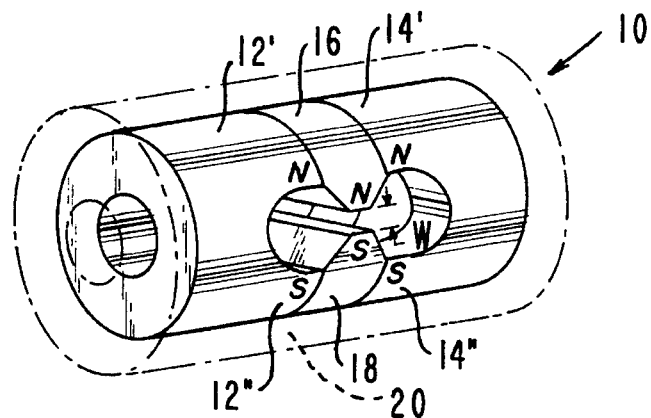
FIG. 1 is a perspective view of an exemplary assembly for practicing the present invention.
Figure 2:
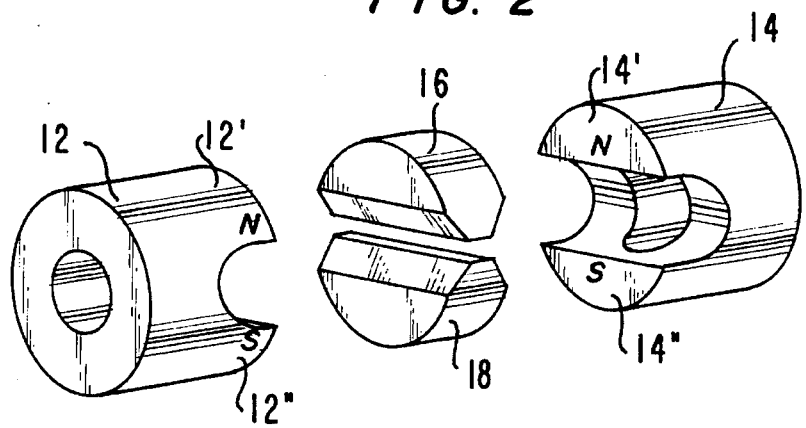
FIG. 2 is an exploded view of the interior components of the assembly of FIG. 1.

An exemplary assembly for treating liquids according to the present invention to enhance a selected desirable property thereof is shown schematically at 10 in FIG. 1. The assembly 10, as shown most clearly in FIGS. 1 and 2, may comprise a first tubular permanent magnet 12 having opposite radially spaced first and second pole portions 12', 12" of opposite polarity. The assembly may further comprise a second tubular magnet 14 having opposite radially spaced first and second pole portions 14', 14" of opposite polarity, and a pair of pole pieces 16, 18 received between the first and second pole portions 12', 14' and 12", 14" of the first and second magnets 12, 14 respectively. Means 20, such as a tubular encasement (container), are provided for maintaining the magnets 12, 14 and pole pieces 16, 18 together so that a fluid flow path is defined from the first tubular magnet 12 past a predetermined gap W (see FIG. 1) established by the pole pieces 16, 18, and through the second magnet 14, and so that the first and second pole portions of the same polarity of each magnet are on the same side of the flow path—that is all north poles on one side of the flow path, and all south poles on the other side of the flow path.

The permanent magnet may be constructed of any material suitable for use as a permanent magnet, such as alnico, tungsten steel, vicalloy, etc. The strength of the magnetic field at the midpoint of the gap W established by the pole pieces 16, 18, should be a minimum of 3000 Gauss.

Figure 3:
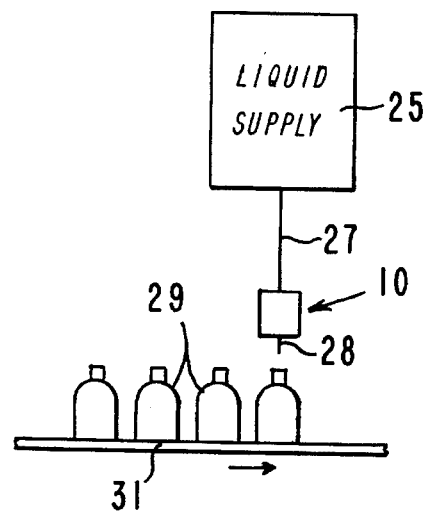
FIG. 3 is a schematic showing illustrating one exemplary use of the assembly of FIG. 1.

According to the present invention, a method of treating a pure consumable liquid is provided consisting essentially of the steps of establishing a substantially constant magnetic field with a minimum strength of about 3000 Gauss, as by employing the assembly 10, and passing the liquid through the field. The magnetic field is preferably established by a permanent magnet (12, 14) and the passing step may be accomplished by establishing a confined flow path for the liquid, with the magnetic field establishing step accomplished by disposing one pole of the permanent magnetic on one side of the flow path and the other pole on an opposite side of the flow path, so that a continuous polarity is established on opposite sides of the flow path during the entire extent of treatment. One practical application of this method is illustrated schematically in FIG. 3, wherein a liquid supply 25 is provided, and a pipe 27 extending from the supply 25 for establishing a flow path for the liquid. The assembly 10 is inserted in the supply pipe 27, and a nozzle 28 or the like extends from the assembly 10. A plurality of bottles 29, to contain the liquid from the supply 25, past the nozzle 28 on a conveyor 31 or the like. Such an arrangement may be especially suited for bottling beer, fruit juices, or beverages containing ethyl alcohol.

In general, the present invention encompasses a method of enhancing a selected desirable property of a liquid consisting essentially of the step of passing the liquid through a magnetic field having properties effective to enhance the selected desirable liquid property. While the invention is most suitable for the enhancement of the flavor of consumable liquids, the invention also has practicality in enhancing desirable properties of nonconsumable liquids, such as enhancing the aroma of aromatic liquids such as perfume. The magnetic field will, probably as a subcomponent contributing to the flavor enhancement, have properties effective to increase the specific gravity of consumable liquids, increase the viscosity thereof, raising the pH of acid consumable liquids, and/or decreasing the average peak height of headspace volatiles when subjected to gas chromatography changing the amount of volatile chemicals in the liquid.

Sensory evaluation tests were conducted utilizing a wide variety of consumable liquids including coffee, gin, chicken soup, orange juice, extruded soy protein, beer, brandy, rum, cointreau, lemonade, tea, creme de menthe, ethyl alcohol, and apple juice (although the invention is not restricted merely to such liquids, such liquids merely being exemplary of liquids that may be treated according to the invention). In tests carried out on a variety of consumable liquids under laboratory conditions as indicated by the Manual on Sensory Testing Methods, American Society for Testing Materials, Publication ST 434, Philadelphia, 1968, utilizing a construction according to FIG. 1 with an approximate magnetic field strength of 3000 Gauss and with a gap W between the pole pieces 16, 20 having a rectangular configuration in cross-section and having a gap width of approximately 1/16 of an inch and a gap length of approximately 1/2 an inch, the following results were obtained:

TABLE 1

| Judge Number | Ratio Magnetic Treated Identification (Enhanced Flavor)/ Total Samples | Percent Selection of Magnetic Treated Sample |
|---|---|---|
| 1 | 3/3 | 100 |
| 2 | 12/15 | 80 |
| 3 | 4/5 | 80 |
| 4 | 4/5 | 80 |
| 5 | 6/8 | 75 |
| 6 | 6/8 | 75 |
| 7 | 8/11 | 73 |
| 8 | 11/16 | 69 |
| 9 | 13/19 | 68 |
| 10 | 6/9 | 66 |
| 11 | 12/19 | 63 |
| 12 | 5/8 | 63 |
| 13 | 12/20 | 60 |
| 14 | 3/5 | 60 |
| 15 | 3/5 | 60 |
| 16 | 3/5 | 60 |
| 17 | 7/12 | 58 |
| 18 | 11/19 | 58 |
| 19 | 8/14 | 57 |
| 20 | 9/16 | 56 |
| 21 | 6/11 | 56 |
| 22 | 11/20 | 55 |
| 23 | 7/13 | 54 |
| 24 | 9/18 | 50 |
| 25 | 3/6 | 50 |
| 26 | 9/20 | 45 |
| 27 | 8/18 | 44 |

The above data is based on combined data for two-sample and three-sample difference tests; pure chance selection probability is 33% for three-sample tests and 50% for two-sample tests. All judges showed more than chance ability to detect differences due to treatment above the average percent probability for combined data. Overall, the selection of the magnetic treated sample was 199/328=61%. That includes data for judges who participated in at least three evaluations; the usual panel observations per product was 18 to 20 including one-time participants. The statistical significance for the most restrictive difference test used (i.e. two-sample) was 182/328 ("Guidebook For Sensory Testing", 3rd Edition, Continental Can Co., Chicago, 1966, page 35).

Physical analysis was also done on selected untreated and magnetic treated consumable liquids; viscosity was measured with a Hoeppler flow type viscosimeter, density was determined gravimetrically using the pycnometer, and pH was measured with an expanded scale Orion Research Model 701A pH Meter. The following results were obtained:

|  | Untreated | Magnetic Treated | Difference |
|---|---|---|---|
| Hoeppler Viscosity Measurements | | | |
| 50% Ethanol | 245 Seconds | 246 Seconds | +1 Second |
| 100% Ethanol | 99 Seconds | 99 Seconds | — |
| Pycnometer Density Measurement | | | |
| *First Gin* | | | |
| 22° C. | 94.1323 grams | 94.1380 grams | +0.0057 grams |
| 23° C. | 94.0943 grams | 94.1016 grams | +0.0073 grams |
| *Second Gin* | | | |
| 22° C. | 94.7646 grams | 94.7673 grams | +0.0027 grams |
| 23° C. | 94.7319 grams | 94.7340 grams | +0.0021 grams |
| *Third Gin* | | | |
| 23° C. | 94.7243 grams | 94.7340 grams | +0.0097 grams |
| Gas Chromatography of Headspace Volatiles; Peak Height (Average) | | | |
| Gin | 59.5 | 48.3 | −11.2 |
| Apple Juice (Amb.) | 6.0 | 4.5 | −1.5 |
| Apple Juice (40C) | 5.0 | 3.0 | −2.0 |
| pH Measurement | | pH | |
| Quiescent Coffee | | 6.225 | |
| Magnetic Treated | | 6.295 | |
| Placebo Device Treated | | 6.310 | |
| Vacuumized Coffee | | 6.537 | |
| Vacuumized and Magnetic Device Treated | | 6.526 | |

The physical data generally support the sensory data in that some physical alterations of the systems appear to be occurring. The gas chromatographic data are strongly suggested of a modification of the ratios of volatile compounds in the exposed systems ($CH_3CH_2OH$ for gin, ethyl-$C_4$ apple esters for apple juice). The specific gravity measurements show slight but consistent increased specific gravities, and the viscosity measurements are not insignificant.

While a maximum magnetic field strength for accomplishing the objectives according to the invention has not been positively determined, maximums are expected to exist. The invention is to be practiced utilizing whatever magnetic field strength is most desirable to effect the intended results.

It will thus be seen that according to the present invention a method is provided for enhancing a selected desirable property of a liquid by passing the liquid through a magnetic field having properties effective to enhance the selected desirable liquid property in general, and in particular, the enhancement of consumable liquid flavor. Additionally, the invention relates to an assembly for effecting such enhancement, and for the enhanced flavor consumable liquid so produced. While the invention has been herein shown and described in what is present conceived to be the most practical and preferred embodiments thereof, it will be apparent to those of ordinary skill in the art that many modifications may be made thereof within the scope of the invention which scope is to be accorded the broadest interpretation of the appended claims so as to encompass all equivalent methods, products, and assemblies.

What is claimed is:

1. A method of treating a beverage selected from the group consisting essentially of ethyl alcohol containing liquids, fruit juices, coffee, tea, extruded soy protein, and chicken soup, to change the flavor thereof, said method consisting essentially of the steps of establishing a substantially constant magnetic field by the use of a plurality of magnets with a minimum strength of about 3000 Gauss, and passing the liquid through the field so that the flavor thereof is changed.

2. A method as recited in claim 1 wherein said establishing step is accomplished with a tubular permanent magnet with a central core through which the liquid passes, and having opposite radially spaced first and second pole portions of opposite polarity.

3. An apparatus for improving the flavor of a fermented substance comprising:

an encasement for a plurality of magnets, and a plurality of permanent magnets mounted within said encasement, each of said magnets having a first pole and a second pole, said first pole of each of said magnets adjacent to a first pole of at least another adjacent permanent magnet, and said second pole of each of said magnets adjacent to a second pole of at least one of the other of said magnets; and said magnets inducing a magnetic field inside said encasement.

4. Apparatus as recited in claim 3 wherein said magnets induce a magnetic field within said encasement of greater than about 3,000 Gauss.

5. Apparatus as recited in claim 3 wherein said permanent magnets are tubular permanent magnet having opposite radially spaced first and second poles of opposite polarity.

6. Apparatus as recited in claim 5 further comprising a pair of pole pieces between said first and second poles of said first and second magnets, said encasement maintaining said magnets and pole pieces together so that a fluid flow path is defined from said first tubular magnet past a predetermined gap established by said pole pieces and through said second magnet.

7. Apparatus as recited in claims 6 wherein the strongest magnetic field is at the mid point of said gap established by said pole pieces, and is greater than about 3,000 Gauss at said gap.

* * * * *